United States Patent [19]

Barry

[11] Patent Number: 5,786,805
[45] Date of Patent: Jul. 28, 1998

[54] METHOD AND APPARATUS FOR IMPROVING OBJECT SELECTION ON A COMPUTER DISPLAY BY PROVIDING CURSOR CONTROL WITH A STICKY PROPERTY

[76] Inventor: Edwin Franklin Barry, 1208 Larkhall Ct., Cary, N.C. 27511

[21] Appl. No.: 774,359

[22] Filed: Dec. 27, 1996

[51] Int. Cl.$^6$ .................................................. G07G 5/08
[52] U.S. Cl. .................................... 345/159; 345/145
[58] Field of Search .............................. 345/157, 145, 345/156, 158, 159, 160–179, 418

[56] References Cited

U.S. PATENT DOCUMENTS

| | | | |
|---|---|---|---|
| 4,757,302 | 7/1988 | Hatakeyama et al. | 340/407 |
| 4,847,605 | 7/1989 | Callahan et al. | 340/709 |
| 4,935,728 | 6/1990 | Kley | 340/709 |
| 5,012,231 | 4/1991 | Felsenstein | 340/709 |
| 5,189,403 | 2/1993 | Franz et al. | 340/711 |
| 5,191,641 | 3/1993 | Yamamoto et al. | 395/118 |
| 5,195,179 | 3/1993 | Tokunaga | 395/161 |
| 5,313,229 | 5/1994 | Gilligan et al. | 345/157 |
| 5,508,717 | 4/1996 | Miller | 345/145 |
| 5,554,980 | 9/1996 | Hashimoto et al. | 345/158 |
| 5,596,347 | 1/1997 | Robertson et al. | 345/145 |

OTHER PUBLICATIONS

IBM Technical Disclosure Bulletin, *Method for Simplifying the Accurate Positioning of a Mouse Pointer*, Apr. 1993, vol. 36, No. 4, pp. 339–342.

*Primary Examiner*—Dennis-Doon Chow
*Attorney, Agent, or Firm*—George E. Grosser

[57] ABSTRACT

A computer system with a graphical user interface that supports selection and dragging of graphic objects using a pointing device is so adapted as to provide automatic adjustment of pointing device sensitivity in a defined range on or around the object so as to create, in effect, a sticky object. By so modifying the cooperation of the pointing device and cursor, the difficult coordination required to position and then select within a narrow zone so as to invoke, for example, a dragging operation becomes simpler and more natural. It is further recognized that, by selectively blocking the modification at some predefined velocity of movement over the object, for which the attack rate by the user would not be consistent with an attempt to select an object, it is possible to avoid introducing confusing "stickiness" when no selection is intended.

8 Claims, 9 Drawing Sheets

METHOD AND APPARATUS FOR IMPROVING OBJECT SELECTION ON A COMPUTER DISPLAY BY PROVIDING CURSOR CONTROL WITH A STICKY PROPERTY

SUMMARY OF THE INVENTION

The invention involves a recognition that by so adjusting the sensitivity of a pointing device that the relative rate of cursor movement drops when the cursor is over or in close proximity to selectable objects on the display screen, a momentary "stickiness" occurs, in effect, at the object, and it is much easier to make a selection without extreme attention and repeated attempts. Further, the dynamics of the cursor movement may be used to provide additional control of the desensitizing effect. For example, high rates of motion (above a threshold), which indicate the user's intent to make a major movement to another part of the screen, may be used to prevent unwanted introduction of the "stickiness" property when no selection is intended. Deceleration of the cursor detected when approaching a selectable object may be used to enable the "stickiness" property for that object. In general, the "sticky" effect may be viewed as a property of displayed objects.

The "sticky" property is achieved by modifying pointing device sensitivity, while its application is controlled by cursor position (over or near a selectable object), cursor dynamics (such as velocity or acceleration used to enable or disable the effect), size or extent of a selectable object, or a global control setting which allows the user to enable or disable the effect for all or some classes of selectable display objects. Pointing device sensitivity is a measure of the amount of cursor motion produced on the display screen for a given (unit) actuation of the pointing device transducer. For mouse type devices, the actuation is a movement in the position (in two dimensions) of the mouse; for pointing stick devices, the actuation is a force on the pointing stick; for trackball type devices the actuation is a rotation of the "ball" transducer, etc. This sensitivity may be modified by varying one or more of a number of different control parameters depending on the particular embodiment of the invention and applies to any type of pointing device transducer.

To achieve the cursor performance according to the invention the position of the display cursor must be tracked by control logic, and the pointing device sensitivity (amount of cursor movement produced for a given actuation of the pointing device) must be controllable over a wide range (including zero—that is no cursor motion for unit actuation of pointing device). When the cursor position crosses the boundary of a selectable object (or comes in close proximity to it), the "sticky" property of the object (if enabled), causes the control logic to reduce the pointing device sensitivity over the object to such an extent that the cursor appears to adhere to the object. The cursor sensitivity may be dropped to a low fixed sensitivity when it crosses into a selectable region (most efficient method) or it may drop in one or more increments as the cursor moves close to a selectable object (assuming the cursor velocity is not above the disable threshold).

With this approach to improving sensitivity characteristics for selection operations the overall characteristics of the pointing device are not compromised. In systems where there are easily selectable objects such as large icons, the size of an object may be used to selectively control the desensitizing of the pointing device to allow only smaller objects such as window borders or button controls to have the "sticky" property when the cursor is over them.

BRIEF DESCRIPTION OF THE DRAWINGS

For a fuller understanding of present implementations of the invention reference should be given to the description taken in conjunction with the drawings, wherein.

DESCRIPTION OF A PREFERRED EMBODIMENT

Figure 1A:
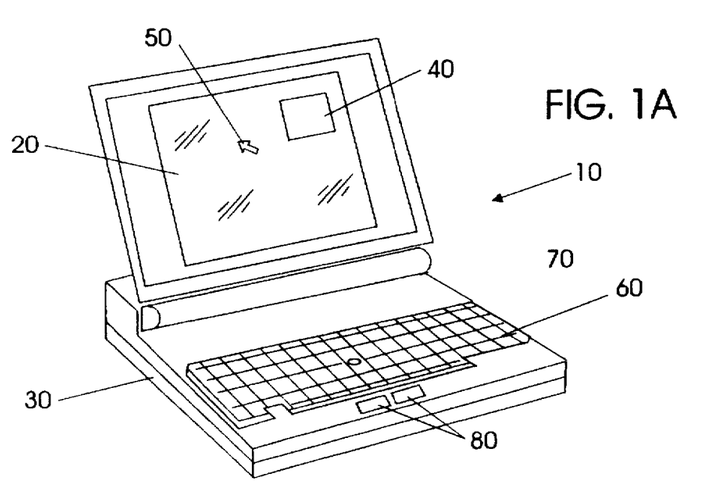
FIG. 1 is an example of two types of common computer systems on which the invention may be employed.
Figure 1B:
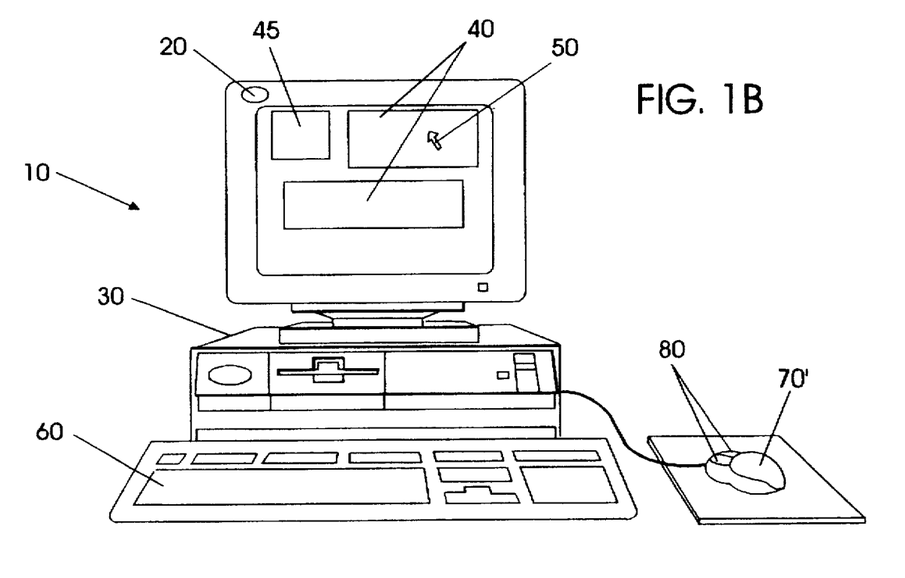

Referring to FIG. 1, a computer system 10 of a type suitable for implementing the inventions includes a display 20 which cooperates with a system unit 30 to display various objects such as a window border 40 or control icon 45 along with a cursor 50. A laptop ("notebook") system and a desktop system are shown although the inventions may also be employed in other system configurations. The system unit 30 in the notebook computer includes an integrated keyboard 60 and a pointing device 70 along with associated selection switches 80 that may be used to select a display object or trigger an event as is well known in the art. Shown is a pointing stick type device 70, but a separate "mouse" 70', trackball-type, infra-red or other pointing device may also be used as is well known.

Figure 2:
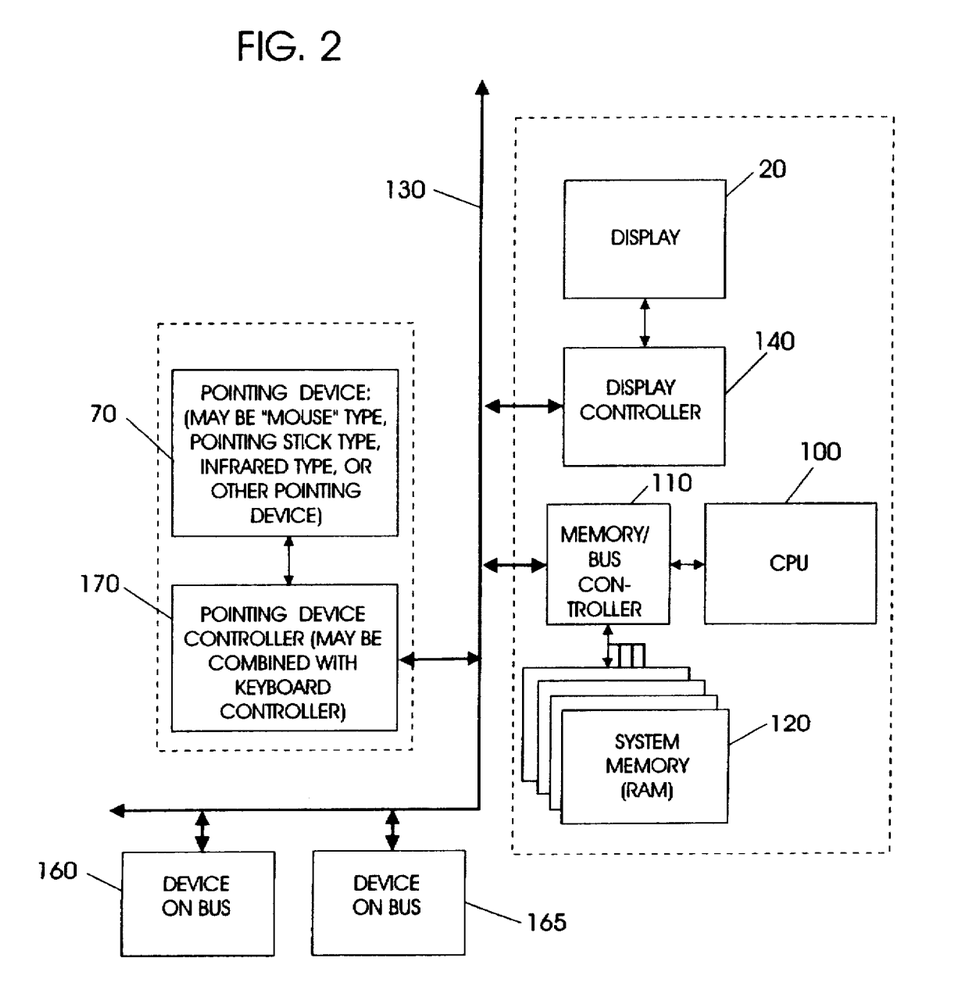
FIG. 2 is a block diagram showing the primary system elements that control the display and placement of the cursor on the display area responsive to the pointing device for apparatus according to a preferred implementation for the invention.

Now, Referring to FIG. 2, the typical system unit 30 (see FIG. 1) includes a central processing unit (CPU) 100 which is connected through a memory/bus controller 110 to random access memory (RAM) 120 used for control program and data storage, and to the system bus 130 including channels for address, data and control signals. The memory/bus controller 110 controls access to the system bus 130, allowing devices on the bus, such as devices 160 and 165, to communicate with the CPU 100 and each other. Among the devices communicating with the CPU 100 via the system bus 130 is a display controller 140 and a pointing device controller 170. The display controller 140 controls the system display 20 which displays objects such as the cursor 50, border 40 and control icon 45 under the control of the CPU 100. The pointing device hardware 70 (see FIG. 1) includes a transducer and selection switches 80. The transducer is used to convert detected motion or force (or other pointing device parameter), applied at the pointing device, into units in a Cartesian (X, Y, and possibly Z) coordinate system (hereinafter displacement). This conversion may take place in the pointing device hardware 160 or in the pointing device controller 170 or a combination of both. The displacement information, along with the states of the selection switches, is sent to the CPU via the pointing device controller 170 and the system bus 130 at intervals dictated by its programmed sampling rate or upon request (polling)

by the CPU 100. (Note that the pointing device controller 170 as described may be any device(s) that perform(s) the function of communicating pointing device actuation to the CPU 100 and may include its own CPU and control program.)

In the following explanation of the embodiment the following terms and assumptions are made:

Selectable areas of the display screen will be referred to as "windows" although the invention does not require a particular display or display area geometry. The "sensitivity" is defined as the ratio of cursor motion as seen on the display, to pointing device "actuation" as recorded in the "horizontal" ("delta h") and "vertical" ("delta v") changes in displacement sent from the pointing device controller 170. A sensitivity of zero means that the cursor does not move on the display for any actuation of the pointing device, while a positive sensitivity implies that the cursor moves some number of display units for a given number of pointing device displacement units. The units of displacement are not important to the invention and may be adjusted using appropriate scale factors.

Display windows according to the invention have a "sticky" attribute which may be a function of their size, their class or some other display attribute. The sticky attribute of a window may be either active (ON) or inactive (OFF). In this embodiment, when the display cursor is over a sticky window that is active, the sensitivity of the pointing device (refer to definition above) is zero. That is, once detected within a window which both has the sticky attribute and the attribute is active, the cursor is "frozen" (sensitivity is zero) for a preselected minimum time. As an alternative the sensitivity might be reduced to a low but non-zero value. It is preferred that only windows which are visible have their sticky attribute enabled.

Figure 3:
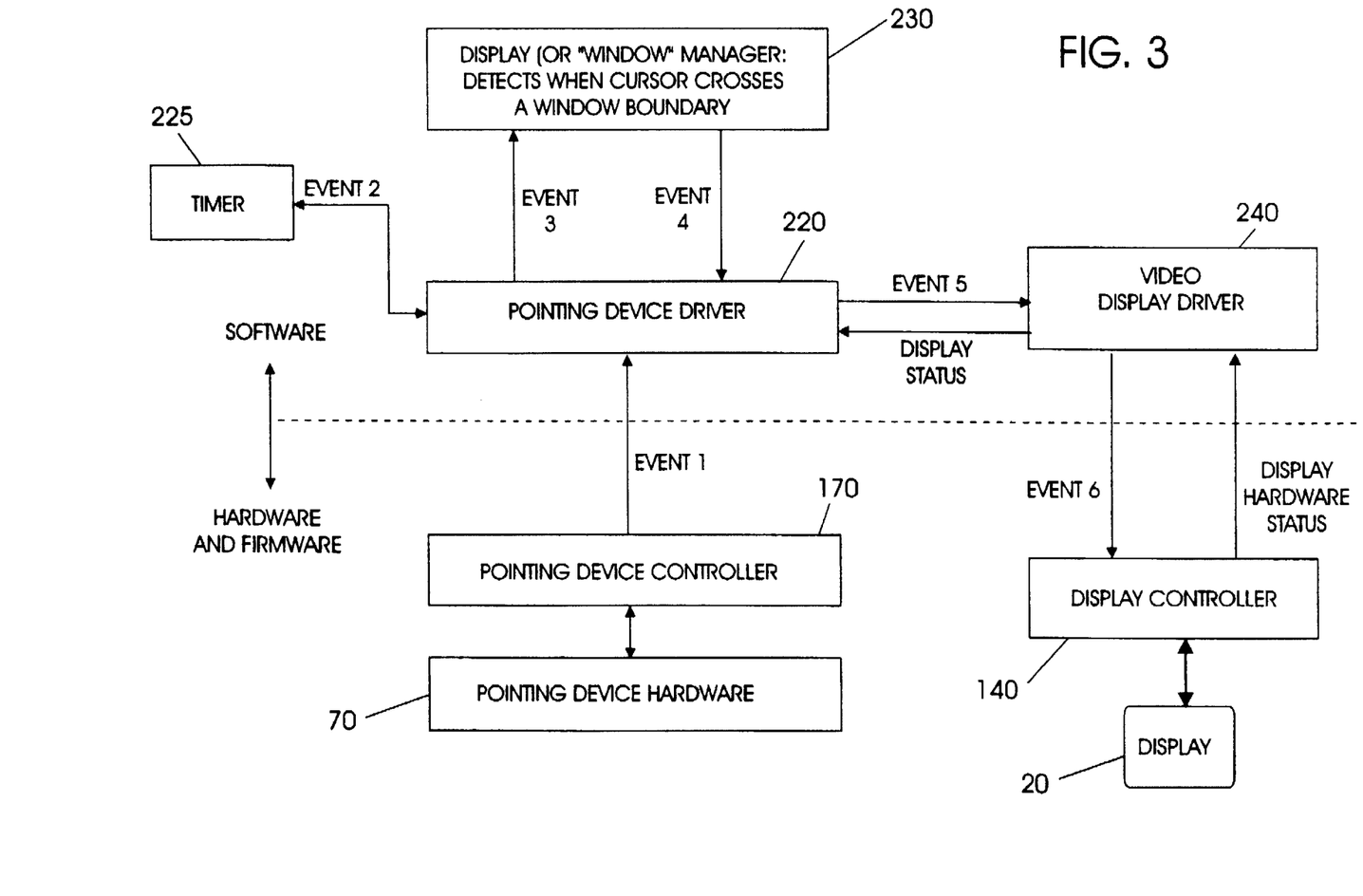
FIG. 3 is a block diagram showing one distribution of software / hardware components which is used in the preferred implementation of the invention described herein.

FIG. 3 shows the flow of information between the pointing device controller 170, the control program executing on the CPU 100 (all components above the dashed line) and the display controller 140 and display 20. Whenever an actuation of the pointing device hardware 70 takes place (motion, force, button press/release, etc.), displacement data is accumulated and delivered to the CPU 100 (see FIG. 2. The maximum rate at which information "packets" are delivered is fixed.

At each sample interval an interrupt (Event 1) is typically generated to the CPU 100 at which point the displacement data (in the form of changes in horizontal and vertical displacement units delta h and delta v) is delivered to the pointing device driver 220. The pointing device driver 220 then calls timer service 225 to obtain a timestamp for the sample. The timestamp is used to calculate the time expired since the last sample was received (delta t). The sample data is retained along with a small number of previous samples and their timestamps. The pointing device driver determines the next cursor position (without updating the display—this may involve a call to the video display driver, which is not shown) and issues a query (Event 3) to the Display Manager 230. The Display Manager returns (Event 4) the following two pieces of information to the pointing device driver 220: an indication of whether or not the location specified by the projected cursor position is "sticky" and an indication of whether the projected cursor position crosses a window boundary.

The pointing device driver 220 uses this information along with the current and previous sample data to determine how to actually update the display cursor (Event 5) by a call to the video display driver 240.

Figure 4:
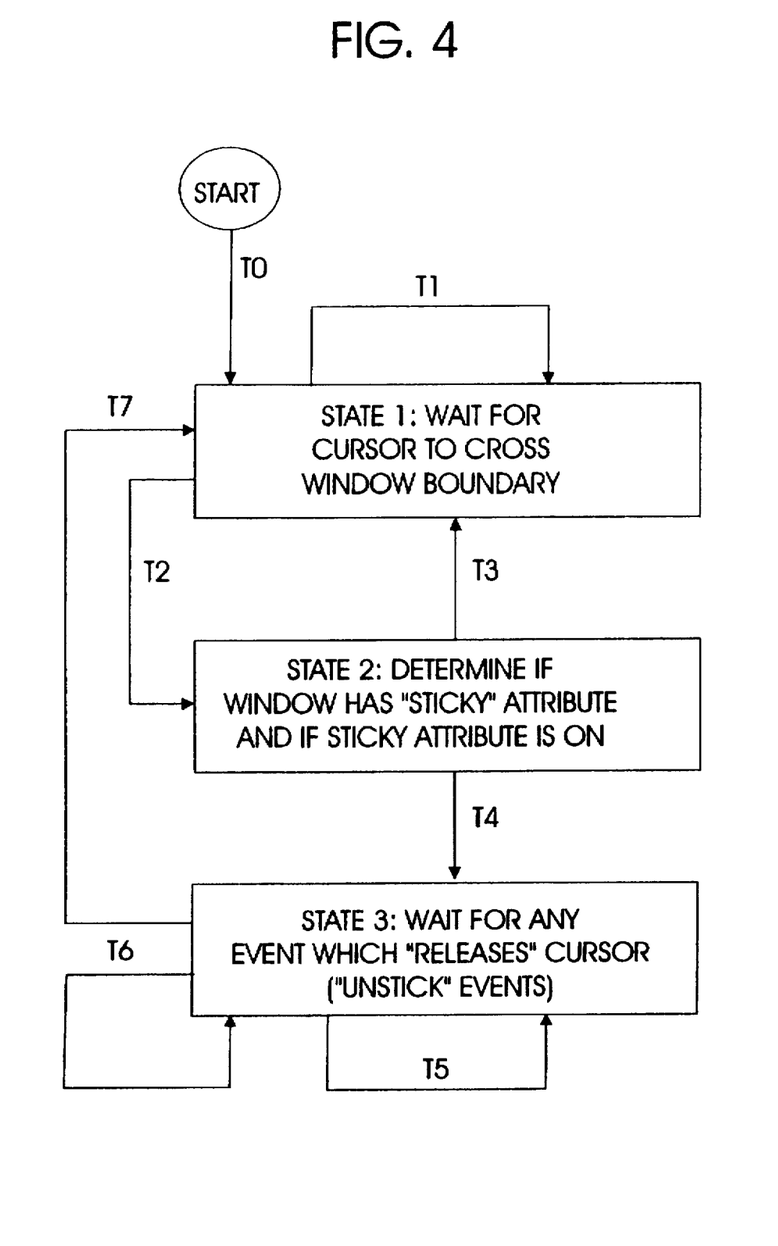
FIG. 4 is a state diagram which describes the operation of the invention in preferred implementation.

FIG. 4 indicates the events and actions associated with them that control the sticky effect of "windows" in this embodiment. For the following explanation refer to both FIG. 4 and FIG. 3.

All state transitions (labeled arrows) are made when a pointing device sample (Event 1 in FIG. 3) occurs. State 1 is the initial state. In this state the sticky effect associated with the window under the cursor (if it has the sticky attribute) is inactive (OFF). The control logic remains in State 1 for all pointing device samples as long as no visible window boundary is crossed. When the display manager 230 detects that the cursor will cross a window boundary into a new window, the display manager determines if the window has the sticky attribute (it does not indicate whether it is ON or OFF), and if so returns this status (Event 4), along with the indication that a window boundary will be crossed at the next cursor position. At this point, State 2 is entered. State 2 is a transition state in which one of two possible outcomes are determined:

If the window has the sticky attribute, and if that attribute is determined to be ON, then the control logic proceeds to State 3 by transition (T4). If the window does not have the sticky attribute, or if the sticky attribute is determined to be OFF, then the control logic proceeds to State 1 by transition (T3).

Whether or not the window has the sticky attribute is returned by the display manager 230. In this embodiment, this information is determined in advance and is simply a property which has been assigned to any window or set of windows (such as "border" class windows, or "control button" class windows). If the window has the sticky propery, determination of whether it is ON or OFF is performed by the pointing device driver 220 and is based on the following quantities:

1) motion velocity as determined with samples of delta h, delta v and delta t.

2) motion acceleration as determined with samples of delta h, delta v and delta t.

3) motion direction as determined with samples of delta h, delta v.

4) whether the cursor was stopped (cursor_stopped).

5) whether a button was pressed or released (button_pressed, button_released).

(Note that velocity, acceleration and direction are not determined using cursor coordinate values, but the raw values received from the pointing device controller 170.)

In the preferred embodiment, the sticky property is ON if velocity is determined to be below a threshold Vsticky, otherwise it is OFF.

If the sticky property is determined by the pointing device driver 220 to be OFF, then the display cursor position is updated normally and the control state becomes State 1. If the sticky property is determined to be ON (velocity is less than Vsticky ) then the following actions are taken:

Set a flag StickyOn to 1 (TRUE) which indicates that subsequent samples will be processed with lowered pointing device sensitivity (in this case, zero) until an "unstick" event occurs.

Save the timestamp value to be used to time how long the sensitivity should be lowered. This is the "start time". The timestamps of subsequent samples are used to determine the time expired since the sticky effect was applied. The display cursor position for this sample is updated normally via a call to the video display driver 250, (Event 5). (Note that this places the cursor in the new window, and on subsequent samples the sticky effect will be active.) State 3 is entered.

In State 3, each pointing device sample is taken as before and the above mentioned derived quantities are calculated. The cursor position is not changed by the pointing device driver (giving the effect of the cursor "sticking" to the window) until a minimum time, Timesticky, has expired and one of the following "unstick" events has occured:

The velocity is zero (pointing device actuation has stopped). This is detected when successive samples are found to be widely separated in time relative to the normal sample period of the pointing device. A time indication is used here simply because no samples occur until pointing device actuation occurs such as:.

A button has been pressed or released.

acceleration is detected as being positive.

Motion direction has changed by more than 90 degrees.

While the sticky effect is active, if the average acceleration is detected to be negative (the pointing device actuation is decreasing, indicating an intention to stop), then the sticky timer is reloaded and the sticky property will remain active for at least another interval Timesticky (see transition T6).

When one of the above "unstick" events occurs, after the sticky timer has timed out, then the display cursor is once again updated normally, the StickyOn variable is cleared to 0 (FALSE) and State 1 is re-entered so that the control logic is waiting to cross a window boundary. The cursor must cross a window boundary before the sticky effect can be turned ON again. This is done to prevent the cursor from being immediately restrained (stuck) to the window after just having been released by a button press or one of the other "unstick" events.

Figure 5:
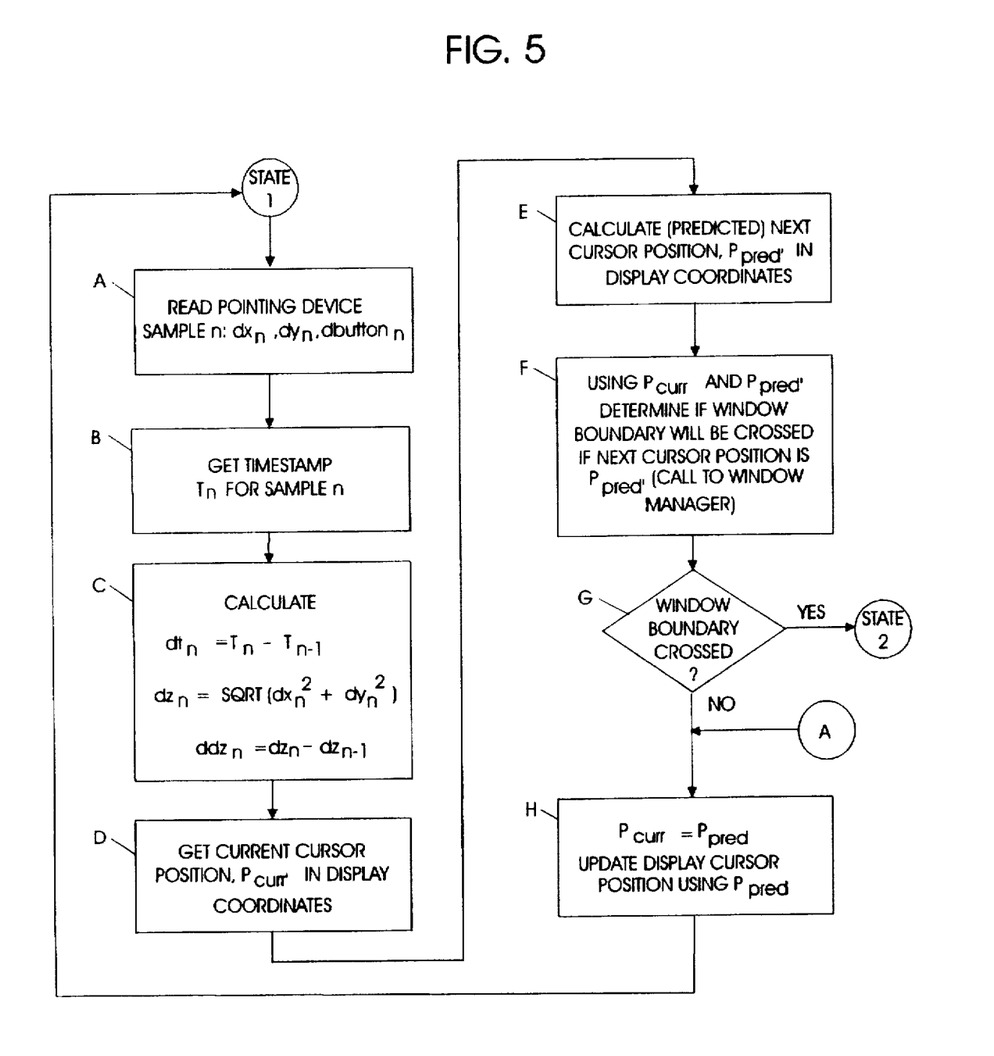
FIGS. 5–7 are flow diagrams showing logic processing for individual states of FIG. 4.

Referring to FIG. 5, the logic for signal processing during State 1 (see also FIG. 4) starts by reading (step A) the output of pointing device 70 to determine, for the sample n, the increment $dx_n$, the y increment $dy_n$, and the button switch 80 state dbutton$_n$. A timestamp $T_n$ is obtained from timer 225 (FIG. 3) and the incremental time $dt_n$ and movement dz (step C). The present cursor position Pcurr is determined (step D) and used to predict the next cursor position Ppred (step E and F). That position is used to test whether a windows boundary is crossed (step G). If "yes" the logic proceeds to State 2 and if "no" the cursor position is updated and the logic returns to step A. The logic of FIGS. 5–7 is preferably implemented by code executed at CPU 100, as-is well know in the art.

Figure 6:
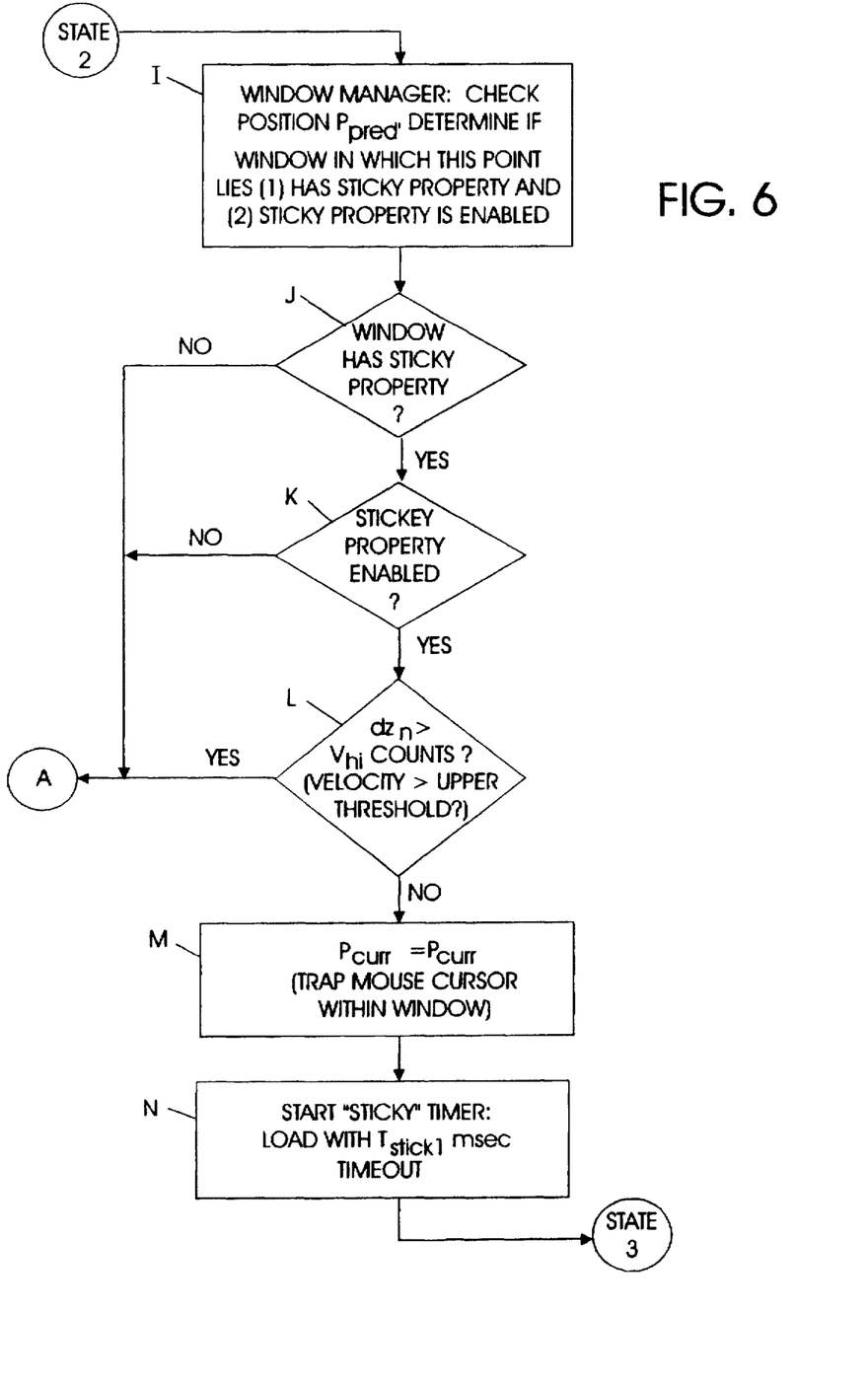

Referring to FIG. 6, the logic of State 2 checks (steps I,J,K,) to determine if an entered window 1) has the sticky property, 2) has it enabled and, 3) whether the cursor velocity is above a predefined threshhold Vhi which indicates a selection is not intended. If these conditions are met, for the preferred embodiment, cursor sensitivity is set to zero (steps M,N) for a preselected time Tstick and control goes to State 3. Otherwise control goes to entry point E1 (see FIG. 5)

Figures 7, 7B:
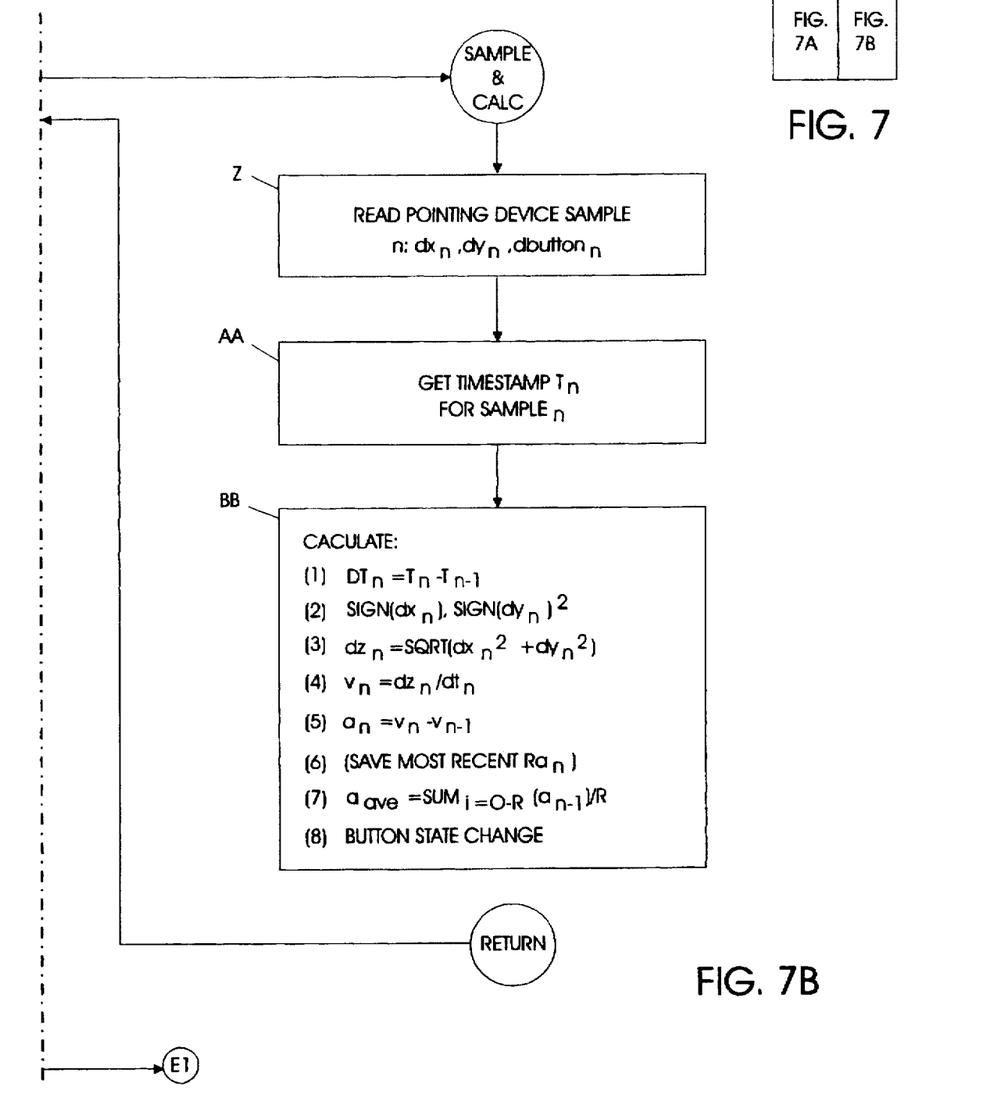
Figure 7A:
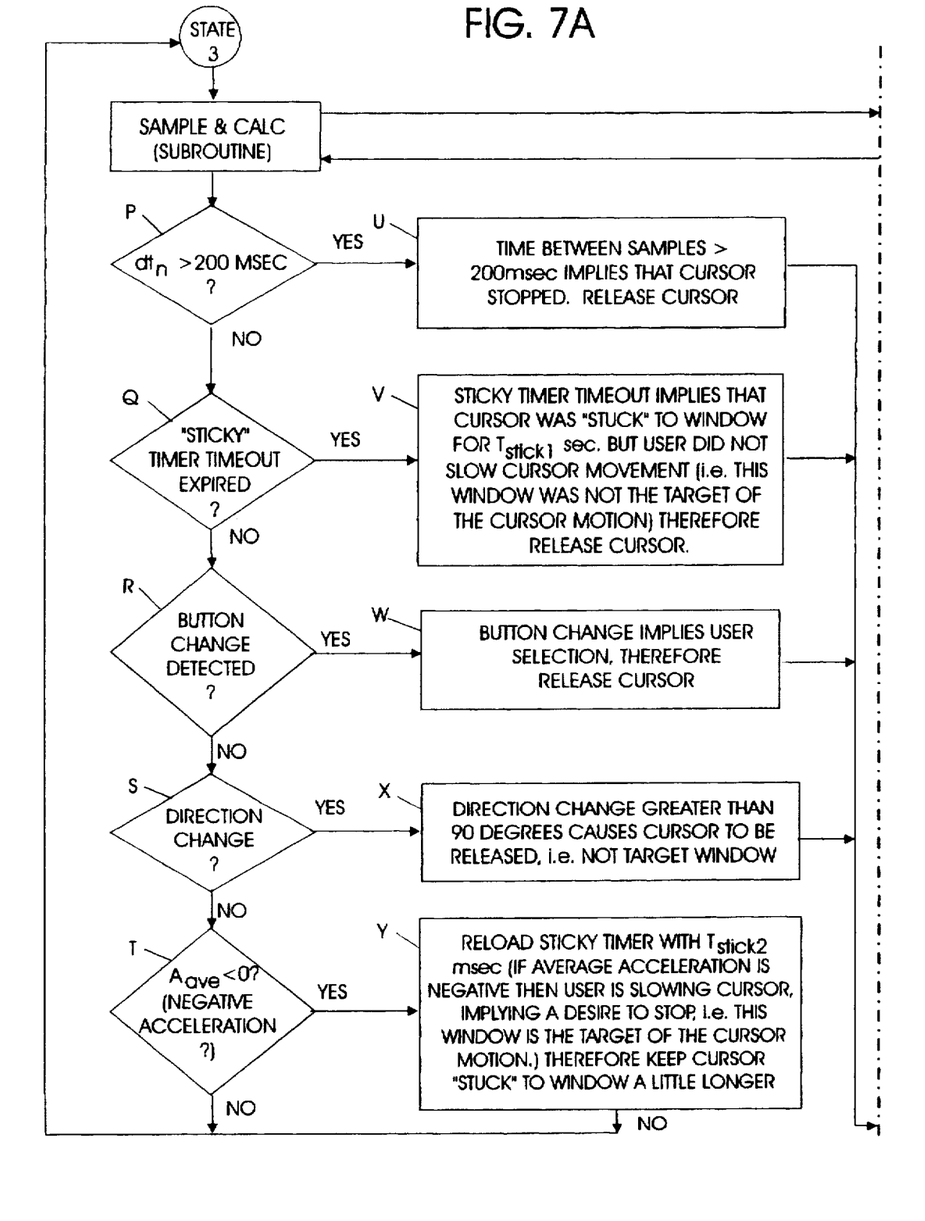
Figure 8:
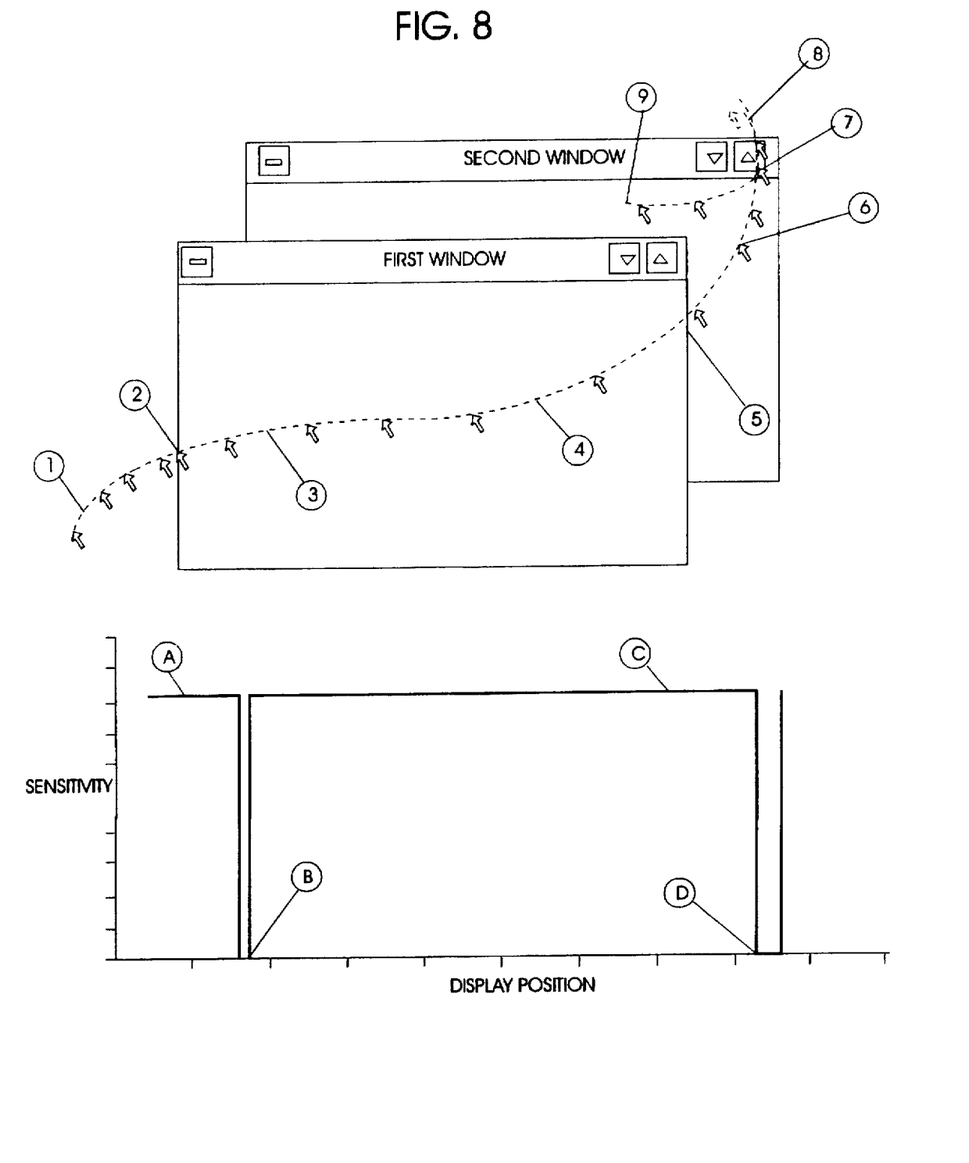
FIG. 8 is pictorial diagram coupled with a graph which shows how the pointing device sensitivity changes with position as the cursor moves over a "sticky" display region according to the invention.

Referring to FIG. 7, the logic of State 3 at steps O,P,Q and S tests for various conditions that, according to the preferred implementation for the invention, should cause the stickiness to be terminated. These conditions are based on a recognition that by so terminating the property the user's most likely intent regarding selection may be more conveniently achieved. Hence if the time between samples exceeds a predetermined value preferably 200 msec the cursor is assumed stopped for selection. If the sticky Tstick expires the user has not proceeded to select. If a button transition is detected, the user has already made a selection. A major direction change indicates the user is not attempting a selection. These conditions lead to a return to State 1. A negative acceleration, on the other hand, is viewed according to the invention as indicating a slowdown for selection and the time for the sticky property is extended when a negative acceleration is detected. FIG. 8 indicates the logic flow as a cursor crosses a "sticky" border window. The graph below the picture indicates the pointing device sensitivity as defined previously. In the figure, the path of cursor arrows indicates the path displayed on the screen and the separation of arrows indicates velocity (larger separation implies larger velocity). At (1) in the picture the cursor is approaching a border object. The cursor velocity is below Vsticky so the cursor becomes "stuck" to the frame at (2) (indicated by a larger cursor and shown at (B) on the graph below the picture). Since this is not the end target, the user continues to move the pointing device (or exert a force on it). After a predetermined period of time "Time" the sticky expires (on the order of 100 msec) and the cursor is released to move normally (i.e. the pointing device sensitivity returns to its normal value). The user notices a slight "grab" or hesitation in the movement of the cursor, but this is not sufficient to cause any trouble with moving the cursor. At (3) the picture indicates that the cursor velocity is increasing and at (4) it is above the velocity threshold Vsticky and the border at (5) does not exhibit any sticky effect (shown at (C) on the graph). At point (6) in the picture, the velocity decreases below Vsticky and at (7), the control button (which also has the sticky attribute) becomes "sticky". The cursor adheres to the button at (7) due to the sensitivity drop shown at (D) on the graph, preventing it from sliding beyond the desired target as it may have done (8) without the sticky property. At (7) a button is pressed, and this releases the sticky effect, restoring the sensitivity to normal, and the cursor moves off into the larger (main) window area (9). Note that this window does not have the sticky attribute because its size is large and does not require the effect to aid in selection. While a flat sensitivity has been shown in FIG. 5 it should be appreciated that the invention may be used in systems that adjust the sensitivity according to manipulation of the pointing device, such as velocity or pressure. The adjustment based on cursor display position relative to a selectable object may be superimposed on such sensitivity adjustments as will be appreciated by the skilled artisan. Presently preferred implementations of the invention have been described with reference to the drawings, however, it should be appreciated that variations within the scope of the claimed invention will be suggested to those skilled in the art.

What is claimed is:

1. A computer system that supports 1) the display of objects on a display area of a display device and 2) a pointing device that, in conjunction with cursor control logic, controls movement of a cursor over the display area of said display device, for purpose including selection individual of said objects, with a predefined sensitivity characteristics wherein said cursor control logic includes position logic for detecting when the cursor is at a point on the display which is within such an object and sensitivity control logic, responsive to said position logic detecting the cursor within said object, that changes the sensitivity of said pointing device wherein the sensitivity control logic reduces the sensitivity of the pointing device when the cursor is detected within said object whereby the pointing device is adapted to more easily permit selection of the object and wherein said sensitivity control logic determines the speed of the cursor as it moves on the display and disables the change in sensitivity if the speed is above a predetermined level.

2. A computer system that supports 1) the display of objects on a display area of a display device and 2) a pointing device that, in conjunction with cursor control logic, controls movement of a cursor over the display area of said display device, for purposes including selection individual of said objects, with a predefined sensitivity characteristic;

wherein said cursor control logic includes position logic for detecting when the cursor is at a point on the display which is within such an object and sensitivity control logic, responsive to said position logic detecting the cursor within said object, that changes the sensitivity of said pointing device;

wherein the sensitivity control logic reduces the sensitivity of the pointing device when the cursor is detected within said object whereby the pointing device is adapted to more easily permit selection of the object; and    wherein the sensitivity of the pointing device is returned to normal if the pointing device is not activated by the user for a predetermined period of time.

3. A computer system that supports 1) the display of objects on a display area of a display device and 2) a pointing device that, in conjunction with cursor control logic, controls movement of a cursor over the display area of said display device, for purposes including selection individual of said objects, with a predefined sensitivity characteristic wherein    said cursor control logic includes position logic for detecting when the cursor is at a point on the display which is within such an object and sensitivity control logic, responsive to said position logic detecting the cursor within said object, that changes the sensitivity of said pointing device;

wherein the sensitivity control logic reduces the sensitivity of the pointing device when the cursor is detected within aid region whereby the pointing device is adapted to more easily permit selection of the object; and    wherein the sensitivity of the pointing device is returned to normal if the pointing device is activated to indicate a direction change for the cursor that is greater than a predetermined value.

4. A selection system improvement for use in a computer system which supports the presentation of display objects for selection on a display of said computer system using a cursor that is moveable, by activating a pointing device having a sensitivity characteristic for cursor movement, to overlay a desired object and a switch that effects selection when the cursor overlays a selectable object, said improvement comprising:

logic for detecting the cursor is at a selectable object and responsively reducing the sensitivity of cursor movement to pointing device actuation;

wherein the sensitivity is reduced to zero for a predetermined period of time whereby an apparent stickiness results; and    wherein the reduction of sensitivity is blocked if the velocity of the cursor is above a predetermined level.

5. A method for improving the selection of objects display on a computer display using a pointing device which controls movement of a displayed cursor that is used for selection, where said pointing device has a sensitivity characteristic when activated for moving said cursor and there is associated with the cursor a selection switch which, if actuated while the cursor overlays a selected object, causes selection, said method comprising the steps of:

monitoring the cursor position to determine if it falls on a selectable object;

reducing, for a predetermined period of time, the sensitivity of said pointing device to zero upon detecting the cursor overlays a point on the selectable object;

monitoring for an actuation of the selection switch during the time when the sensitivity is reduced;

returning the sensitivity to the original sensitivity characteristics if a selection occurs before the predetermined period of time expires;

monitoring the velocity of the cursor; and blocking the step of reducing sensitivity if the velocity of the cursor exceeds a predetermined value.

6. A computer system that supports 1) the display of objects on a display device and 2) a pointing device that, in conjunction with cursor control logic, controls movement of a cursor over the display area of said display device, for purposes including selection of said objects, with a predefined sensitivity characteristics;

wherein said cursor control logic includes position logic for detecting when the cursor is at a point on the display which is within such an object and sensitivity control logic, responsive to said position logic detecting the cursor in said region, that changes the sensitivity of said pointing device    wherein the display objects are respectively identified as having a sticky property or not and wherein the sensitivity control logic reduces the sensitivity of the pointing device when the cursor is detected in said region but only if the respective object has the sticky property, whereby the pointing device is adapted to readily permit selection of those objects with the sticky property; and    wherein said sensitivity control logic determines the speed of the cursor as it moves on the display and disables the change in sensitivity if the speed is above a predetermined level.

7. A computer system that supports 1) the display of objects on a display device and 2) a pointing device that, in conjunction with cursor control logic, controls movement of a cursor over the display area of said display device, for purposes including selection of said objects, with a predefined sensitivity characteristic wherein    said cursor control logic include position logic for detecting when the cursor is at a point on the display which is within such an object and sensitivity control logic, responsive to said position logic detecting the cursor in said region, that changes the sensitivity of said pointing device;

wherein the display objects are respectively identified as having a sticky property or not;

wherein the sensitivity control logic reduces the sensitivity of the pointing device when the cursor is detected in said region but only if the respective object has the sticky property, whereby the pointing device is adapted to readily permit selection of those objects with the sticky property; and    wherein the sensitivity of the pointing device is returned to normal if the pointing device is not activated by the user for a predetermined period of time.

8. A computer system that supports 1) the display of objects on a display device and 2) a pointing device that, in conjunction with cursor control logic, controls movement of a cursor over the display area of said display device, for purposes including selection of said objects, with a predefined sensitivity characteristics;

wherein said cursor control logic includes position logic for detecting when the cursor is at a point on the display which is within such an object and sensitivity control logic, responsive to said position logic detecting the cursor in said region, that changes the sensitivity of said pointing device;

wherein the display objects are respectively identified as having a sticky property or not and wherein the sensitivity control logic reduces the sensitivity of the pointing device when the cursor is detected in said region but only if the respective object has the sticky property, whereby the pointing device is adapted to readily permit selection of those objects with the sticky property; and wherein the sensitivity of the pointing device is returned to normal if the pointing device is activated to indicate a direction change for the cursor that is greater than a predetermined value.

* * * * *